US008246506B2

(12) United States Patent
Matsubara et al.

(10) Patent No.: US 8,246,506 B2
(45) Date of Patent: Aug. 21, 2012

(54) CONTROL APPARATUS FOR VEHICULAR POWER TRANSMITTING SYSTEM

(75) Inventors: Tooru Matsubara, Toyota (JP); Kenta Kumazaki, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1132 days.

(21) Appl. No.: 12/153,356

(22) Filed: May 16, 2008

(65) Prior Publication Data
US 2008/0312029 A1 Dec. 18, 2008

(30) Foreign Application Priority Data
May 24, 2007 (JP) .................................. 2007-138356

(51) Int. Cl.
*B60K 1/02* (2006.01)
(52) U.S. Cl. ........................................... 477/3; 477/118
(58) Field of Classification Search .................. 477/3–6, 477/15, 20, 70, 73, 77, 79–80, 92, 94, 118, 477/187; 701/54–56
See application file for complete search history.

(56) References Cited

U.S. PATENT DOCUMENTS

| 3,640,156 | A | * | 2/1972 | Mori et al. | 477/93 |
| 5,830,105 | A | * | 11/1998 | Iizuka | 477/92 |
| 6,287,237 | B1 | * | 9/2001 | Graf et al. | 477/94 |
| 7,416,511 | B2 | * | 8/2008 | Nishina et al. | 477/5 |
| 7,534,190 | B2 | * | 5/2009 | Tabata et al. | 477/3 |
| 7,967,726 | B2 | * | 6/2011 | Kim | 477/118 |
| 2003/0045389 | A1 | | 3/2003 | Kima | |
| 2006/0166784 | A1 | * | 7/2006 | Tabata et al. | 477/37 |
| 2009/0088290 | A1 | | 4/2009 | Tabata et al. | |
| 2009/0312142 | A1 | * | 12/2009 | Minamikawa | 477/5 |

FOREIGN PATENT DOCUMENTS

| JP | A-2001-173768 | 6/2001 |
| JP | A-2003-072403 | 3/2003 |
| JP | A-2006-213149 | 8/2006 |
| JP | A-2006-335127 | 12/2006 |

OTHER PUBLICATIONS

Office Action issued in Chinese Patent Application No. 200810098418.5 dated Dec. 28, 2010 (with translation).
Office Action dated Sep. 13, 2011 issued in Japanese Patent Application No. 2007-138356 (with translation).

\* cited by examiner

*Primary Examiner* — Justin Holmes
*Assistant Examiner* — Huan Le
(74) *Attorney, Agent, or Firm* — Oliff & Berridge, PLC

(57) ABSTRACT

A control apparatus for a vehicular power transmitting system including (a) an electrically controlled differential portion which has a differential mechanism and a first electric motor connected to a rotary element of the differential mechanism and which is operable to control a differential state between rotating speeds of its input and output shafts by controlling an operating state of the first electric motor, and (b) a step-variable transmission portion which constitutes a part of a power transmitting path between the electrically controlled differential portion and a drive wheel of a vehicle, the control apparatus including a coasting-shift-down control portion configured to implement a coasting shift-down action of the step-variable transmission portion during a coasting run of the vehicle, only when a parameter correlating with a shaft torque of the step-variable transmission portion during the coasting run is held within a predetermined range.

20 Claims, 10 Drawing Sheets

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL APPARATUS FOR VEHICULAR POWER TRANSMITTING SYSTEM

CROSS REFERENCE TO RELATED APPLICATION

The present application claims priority from Japanese Patent Application No. 2007-138356, which was filed on May 2, 2007, the disclosure of which is herein incorporated by reference in its entirety.

BACKGROUND OF THE INVENTION

1. Field of the Invention

The present invention relates in general to a control apparatus for a vehicular hybrid-type power transmitting system including an electrically controlled differential portion and a step-variable transmission portion, and more particularly to techniques for reducing a possibility of interruption of deceleration of a vehicle in the process of a shift-down action of the step-variable transmission portion during coasting of the vehicle.

2. Discussion of Prior Art

There is known a vehicular power transmitting system including (a) an electrically controlled differential portion which has a differential mechanism and an electric motor connected to a rotary element of the differential mechanism and which is operable to control a differential state between rotating speeds of its input and output shafts by controlling an operating state of the electric motor, and (b) a step-variable transmission portion which constitutes a part of a power transmitting path between the electrically controlled differential portion and a drive wheel of a vehicle. JP-2006-213149A discloses an example of such a vehicular power transmitting system. The differential mechanism of the vehicular power transmitting system disclosed in this publication is provided with a differential-state switching device operable to switch the differential mechanism between a step-variable shifting state and a continuously-variable shifting state. The above-identified publication also discloses a control apparatus for the vehicular power transmitting system, which control apparatus is configured such that a selected one of an operation to switch the shifting state of the differential mechanism and an operation to start an engine is implemented prior to the other if the switching operation of the shifting state and the starting operation of the engine would otherwise overlap each other, so that a switching shock of the differential mechanism is reduced.

In a hybrid-type power transmitting system including an engine and an electric motor as disclosed in the above-identified publication, it is desirable to control the electric motor for synchronization of the output shaft speed of the differential mechanism with a synchronizing speed of a selected gear position of the step-variable transmission portion, for reducing a shift-down shock of the step-variable transmission portion in a shift-down action thereof during coasting of the vehicle. To effect this synchronizing control, it is necessary to temporarily place the step-variable transmission portion in a neutral state in the process of the shift-down action. In the neutral state of the step-variable transmission portion, however, there is a possibility of interruption of deceleration of the vehicle in the process of the shift-down action of the step-variable transmission portion, due to disconnection of the step-variable transmission from the drive wheel driven by a kinetic energy of the coasting vehicle, so that the vehicle operator may recognize the interrupted deceleration of the vehicle unexpectedly during the coasting run of the vehicle.

SUMMARY OF THE INVENTION

The present invention was made in view of the background art discussed above. It is therefore an object of this invention to provide a control apparatus for a hybrid-type vehicular power transmitting system including an electrically controlled differential portion and a step-variable transmission portion, which control apparatus permits not only reduction of a shift-down shock of the step-variable transmission portion, but also reduction of a possibility of interruption of deceleration of a vehicle in the process of a shift-down action of the step-variable transmission portion during coasting of the vehicle.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular power transmitting system including (a) an electrically controlled differential portion which has a differential mechanism and a first electric motor connected to a rotary element of the differential mechanism and which is operable to control a differential state between rotating speeds of its input and output shafts by controlling an operating state of the first electric motor, and (b) a step-variable transmission portion which constitutes a part of a power transmitting path between the electrically controlled differential portion and a drive wheel of a vehicle, the control apparatus comprising a coasting-shift-down control portion configured to implement a coasting shift-down action of the step-variable transmission portion during a coasting run of the vehicle, only when a parameter correlating with a shaft torque of the step-variable transmission portion during the coasting run is held within a predetermined range.

In the control apparatus according to the above-described mode (1) of the present invention, the coasting-shift-down control portion is configured to implement a coasting shift-down action of the step-variable transmission portion during a coasting run of the vehicle, only when the parameter correlating with the shaft torque of the step-variable transmission portion during the coasting run is held within a predetermined range. Accordingly, the coasting shift-down action takes place only when the parameter correlating to the shaft torque of the step-variable transmission portion is held within the predetermined range. The coasting-shift-down control portion permits effective reduction of the possibility of temporary interruption of deceleration of the vehicle in the process of the coasting shift-down action of the step-variable transmission portion.

(2) The control apparatus according to the above-described mode (1), wherein the parameter correlating to the shaft torque of the step-variable transmission portion is a running speed of the vehicle, and the coasting-shift-down control portion stores in a memory a predetermined reference value of the running speed of the vehicle at or below which the above-indicated shaft torque is smaller than a predetermined upper limit, the coasting-shift-down control portion implementing the coasting shift-down action of the step-variable transmission portion when the actual running speed of the vehicle has been lowered to the predetermined reference value.

In the above-described mode (2) of the invention, the predetermined reference value of the vehicle running speed is stored in the memory of the coasting-shift-down control portion, as an upper limit of the vehicle running speed at or below which the shaft torque of the step-variable transmission portion is smaller than the predetermined upper limit. The coasting-shift-down control portion implements or initiates the coasting shift-down action of the step-variable transmission portion when the actual running speed of the vehicle has been lowered to the predetermined reference value. Accordingly, the shaft torque of the step-variable transmission portion is limited to its upper limit in the process of the coasting shift-down action, so that the possibility of the temporary interruption of deceleration of the vehicle in the process of the coasting shift-down action of the step-variable transmission portion is effectively reduced.

(3) The control apparatus according to the above-described mode (2), wherein the coasting-shift-down control portion includes a reference-vehicle-speed changing portion configured to change the predetermined reference value of the running speed depending upon a gradient of a roadway on which the vehicle is running in a coasting state.

In the above-described mode (3) of this invention, the reference-vehicle-speed changing portion permits the coasting shift-down action of the step-variable transmission portion to be initiated at a suitable point of time depending upon the gradient of the roadway, for reducing the possibility of the temporary interruption of deceleration of the vehicle in the process of the coasting shift-down action.

(4) The control apparatus according to any one of the above-described modes (1)-(3), wherein the coasting-shift-down control portion includes a synchronization control portion configured to implement a synchronization control of a rotating speed of an input shaft of the step-variable transmission portion in the process of the coasting shift-down action.

In the above-described mode (4), the synchronization control of the input shaft speed of the step-variable transmission portion implemented by the synchronization control portion permits effective reduction of a shift-down shock of the step-variable transmission portion.

(5) The control apparatus according to the above-described mode (4), wherein the vehicular power transmitting system further includes a second electric motor which is provided in addition to the first electric motor and which is operatively connected to the output shaft of the electrically controlled differential portion, and wherein the synchronization control portion implements the synchronization control by controlling the second electric motor.

In the above-described mode (5) of the present invention, the synchronization control of the input shaft speed of the step-variable transmission portion can be rapidly implemented by an electric control of the second electric motor operatively connected to the output shaft of the electrically controlled differential portion.

(6) The control apparatus according to the above-described mode (5), wherein the coasting-shift-down control portion is configured to place the step-variable transmission portion in a neutral state during the synchronization control implemented by the synchronization control portion.

In the above-described mode (6), the input shaft speed of the step-variable transmission portion can be rapidly synchronized in the neutral state in which the step-variable transmission portion is disconnected from the drive wheel driven by a kinetic energy of the coasting vehicle.

(7) The control apparatus according to any one of the above described modes (1)-(6), wherein the coasting-shift-down control portion includes a compensating portion configured to decelerate the vehicle in the process of the coasting shift-down action of the step-variable transmission portion, the coasting shift-down control portion initiating the coasting shift-down action at a higher running speed of the vehicle when the compensating portion is operable to decelerate the vehicle, than when the compensating portion is not operable.

In the above-described mode (7) of the invention in which the vehicle is decelerated by the compensating portion in the process of the coasting shift-down action of the step-variable transmission portion when the compensating portion is normally operable, so that a possibility of temporary interruption of deceleration of the coasting vehicle in the process of the coasting shift-down action can be reduced owing to the vehicle deceleration by the compensating portion, even if the coasting shift-down action is initiated at the predetermined higher running speed of the vehicle. Further, the initiation of the coasting shift-down action at the higher running speed of the vehicle permits an operation of a second electric motor as an electric generator at a comparatively high speed, so that the second electric motor regenerates a comparatively large amount of electric energy.

(8) The control apparatus according to the above-described mode (7), wherein the vehicle is provided with a wheel brake operable to brake the drive wheel, and the compensating portion is configured to decelerate the vehicle by operating the wheel brake.

In the above-described mode (8) of the present invention, the vehicle is decelerated by the wheel brake in the process of the coasting shift-down action of the step-variable transmission portion under the control of the compensating portion. Thus, the compensating portion does not require a device exclusively provided for decelerating the vehicle in the process of the coasting shift-down action of the step-variable transmission portion, for reducing the possibility of temporary interruption of deceleration of the vehicle when the step-variable transmission portion is placed in the neutral state in the process of the coasting shift-down action.

(9) The control apparatus according to any one of the above-described modes (1)-(8), wherein the electrically controlled differential portion is operable as a continuously-variable transmission mechanism when the operating state of the first electric motor is controlled.

In the above-described mode (9) wherein the electrically controlled differential portion is operable as the continuously-variable transmission mechanism by controlling the first electric motor, the overall speed ratio of the power transmitting system can be smoothly and continuously changed. However, the electrically controlled differential portion may be operable as a step-variable transmission mechanism the speed ratio of which is variable in steps, so that the overall speed ratio of the power transmitting system can be rapidly changed in steps.

(10) The control apparatus according to any one of the above-described modes (1)-(9), wherein the differential mechanism is a single-pinion type planetary gear set.

In the above-described mode (10), the differential mechanism consisting of the single single-pinion type planetary gear set can be simplified in construction, and the required axial dimension of the differential mechanism can be reduced.

(11) The control apparatus according to any one of the above-described modes (1)-(10), wherein the vehicular power transmitting system has an overall speed ratio defined by a speed ratio of the step-variable transmission and a speed ratio of the electrically controlled differential portion.

In the above-described mode (11), the vehicle drive force can be obtained over a wide range of speed ratio, by changing the speed ratio (gear ratio) of the transmission portion as well as the speed ratio of the differential portion.

(12) The control apparatus according to the above-described modes (1)-(11), wherein the step-variable transmission portion is a step-variable automatic transmission.

In the above-described mode (12), the electrically controlled differential portion functioning as an electrically controlled continuously variable transmission cooperates with the step-variable automatic transmission to constitute a continuously variable transmission mechanism which is operable to smoothly change the vehicle drive torque. When the speed ratio of the electrically controlled differential portion is controlled to be held constant, the electrically controlled differential portion and the step-variable transmission portion cooperate with each other to constitute a step-variable transmission mechanism the overall speed ratio of which is variable in steps, permitting a rapid change of the vehicle drive torque.

(13) A control apparatus for a vehicular power transmitting system including an electrically controlled differential portion which has a differential mechanism and an electric motor connected to a rotary element of the differential mechanism and which is operable to control a differential state between rotating speeds of its input and output shafts by controlling an operating state of the electric motor, and (b) a step-variable transmission portion (20) which constitutes a part of a power transmitting path between the electrically controlled differential portion and a drive wheel of a vehicle, said control apparatus comprising:

a coasting-shift-down control portion configured to implement a coasting shift-down action of said step-variable transmission portion during a coasting run of the vehicle, and wherein said coasting-shift-down control portion includes a compensating portion configured to decelerate the vehicle in the process of the coasting shift-down action of the step-variable transmission portion (20), the coasting shift-down control portion initiating the coasting shift-down action at a higher running speed of the vehicle when the compensating portion is operable to decelerate the vehicle, than when the compensating portion is not operable.

In the control apparatus according to the above-described mode (13) of this invention in which the vehicle is decelerated by the compensating portion in the process of the coasting shift-down action of the step-variable transmission portion when the compensating portion is normally operable, so that a possibility of temporary interruption of deceleration of the coasting vehicle in the process of the coasting shift-down action can be reduced owing to the vehicle deceleration by the compensating portion, even if the coasting shift-down action is initiated at the predetermined higher running speed of the vehicle. Further, the initiation of the coasting shift-down action at the higher running speed of the vehicle permits an operation of a second electric motor as an electric generator at a comparatively high speed, so that the second electric motor regenerates a comparatively large amount of electric energy.

(14) The control apparatus according to the above-described mode (13), wherein the vehicle is provided with a wheel brake operable to brake the drive wheel, and the compensating portion is configured to decelerate the vehicle by operating the wheel brake.

The control apparatus according to the above-described mode (14) has the same advantage as described above with respect to the above-described mode (8).

(15) The control apparatus according to the above-described mode (13) or (14), wherein the coasting-shift-down control portion includes a synchronization control portion configured to implement a synchronization control of a rotating speed of an input shaft of the step-variable transmission portion in the process of the coasting shift-down action, and wherein the coasting-shift-down control portion is configured to place the step-variable transmission portion in a neutral state during the synchronization control implemented by the synchronization control portion.

The control apparatus according to the above-described mode (15) has the same advantage as described above with respect to the above-described mode (6).

(16) The control apparatus according to any one of the above-described modes (13)-(15), wherein the electrically controlled differential portion is operable as a continuously-variable transmission mechanism when the operating state of the electric motor is controlled.

The control apparatus according to the above-described mode

(16) has the same advantage as described above with respect to the above described mode (9).

(17) The control apparatus according to any one of the above-described modes (13)-(16), wherein the parameter correlating to the shaft torque of the step-variable transmission portion is a running speed of the vehicle, and the coasting-shift-down control portion stores in a memory a predetermined reference value of the running speed of the vehicle at or below which said shaft torque is smaller than a predetermined upper limit, the coasting-shift-down control portion implementing the coasting shift-down action of the step-variable transmission portion when the actual running speed of the vehicle has been lowered to the predetermined reference value, and wherein the coasting-shift-down control portion includes a reference-vehicle-speed changing portion configured to change the predetermined reference value of the running speed depending upon a gradient of a roadway on which the vehicle is running in a coasting state.

The control apparatus according to the above-described mode (17) has the same advantage as described above with respect to the above-described mode (3).

(18) The control apparatus according to any one of the above-described modes (13)-(17), wherein the differential mechanism is a single-pinion type planetary gear set.

The above-described mode (18) has the same advantage as described above with respect to the above-described mode (10).

(19) The control apparatus according to any one of the above-described modes (13)-(18), wherein the vehicular power transmitting system has an overall speed ratio defined by a speed ratio of the step-variable transmission and a speed ratio of the electrically controlled differential portion.

The above-described mode (19) has the same advantage as descried above with respect to the above-described mode (11).

(20) The control apparatus according to any one of the above-described modes (13)-(19), wherein the step-variable transmission portion is a step-variable automatic transmission.

The above-described mode (20) has the same advantage as described above with respect to the above-described mode (12).

BRIEF DESCRIPTION OF THE DRAWINGS

The above and other objects, features, advantages, and technical and industrial significance of this invention will be better understood by reading the following detailed description of a preferred embodiment of the present invention, when considered in connection with the accompanying drawings, in which:

FIG. 1 is a schematic view showing an arrangement of a power transmitting system for a hybrid vehicle, which is controlled by a control apparatus constructed according to one embodiment of this invention;

FIG. 2 is a table indicating shifting actions of an automatic transmission portion provided in the power transmitting system of FIG. 1, in relation to different combinations of operating states of hydraulically operated frictional coupling devices to effect the respective shifting actions;

FIG. 11 is a flow chart illustrating a control routine executed by the electronic control device of FIG. 4, for reducing not only a shift-down shock of the automatic transmission portion during coasting of the vehicle, but also a possibility of interruption of deceleration of the vehicle in the process of the shift-down action; and.

DETAILED DESCRIPTION OF THE PREFERRED EMBODIMENT

Figure 7:
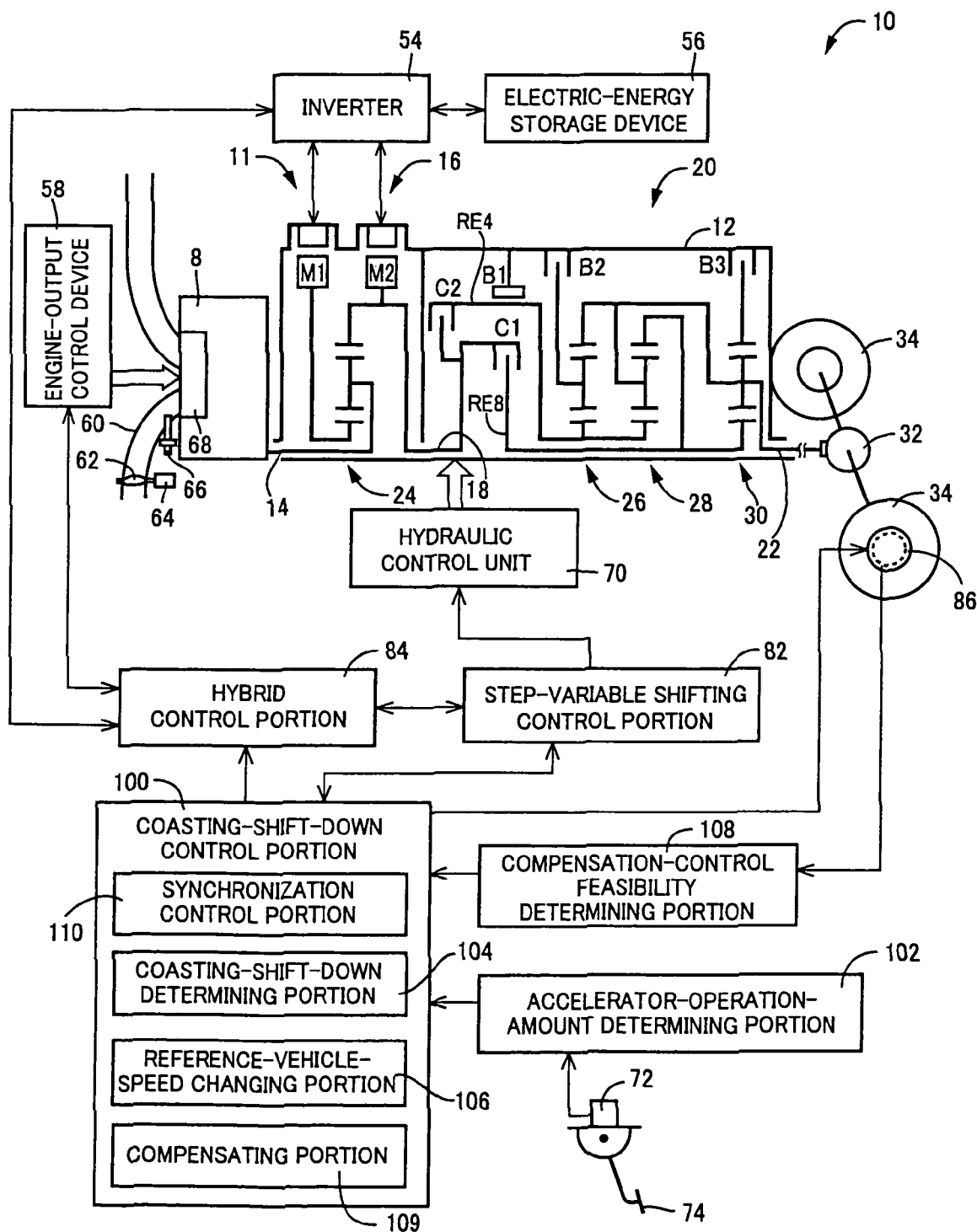
FIG. 7 is a functional block diagram illustrating major control functions of the electronic control device of FIG. 4.

Referring first to the schematic view of FIG. 1, there is shown a transmission mechanism 10 constituting a part of a power transmitting system for a hybrid vehicle, which power transmitting system is controlled by a control apparatus constructed according to one embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force. It will be understood that the differential portion 11 functions as an electrically controlled differential portion.

The power distributing mechanism 16 includes, as a major component, a first planetary gear set 24 of a single pinion type having a gear ratio $\rho 1$ of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Thus, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max. It will be understood that the power distributing mechanism 16 functions as a differential mechanism while the power transmitting member 18 functions as an output shaft of the differential mechanism.

The automatic transmission portion 20 is a step-variable automatic transmission which constitutes a part of a power transmitting path between the differential portion 11 and the drive wheels 34. The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2, ZS3/ZR3, and ZS4/ZR4, respectively. It will be understood that the automatic transmission portion 20 functions as a step-variable transmission portion.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through one of the first and second clutches C1, C2, which are provided to shift the automatic transmission portion 20. In other words, the first and second clutches C1, C2 function as coupling devices operable to switch a power transmitting path between the power distributing member 18 and the automatic transmission portion 18, to a selected one of a power transmitting state in which a vehicle drive force can be transmitted through the power transmitting path, and a power cut-off state in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate with each other to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle power transmitting system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
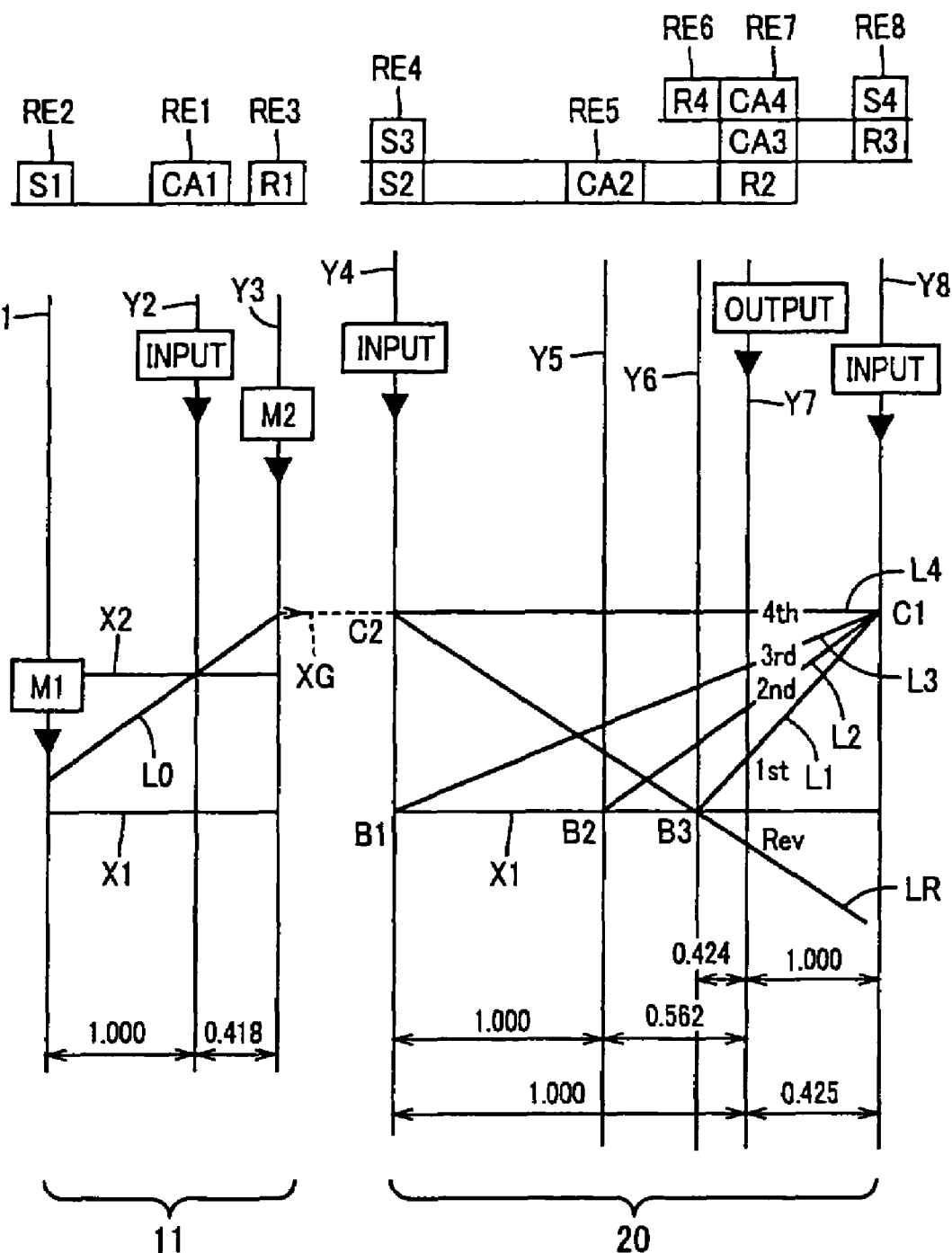
FIG. 3 is a collinear chart indicating relative rotating speeds of rotary elements of a differential portion and the automatic transmission portion of the power transmitting system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
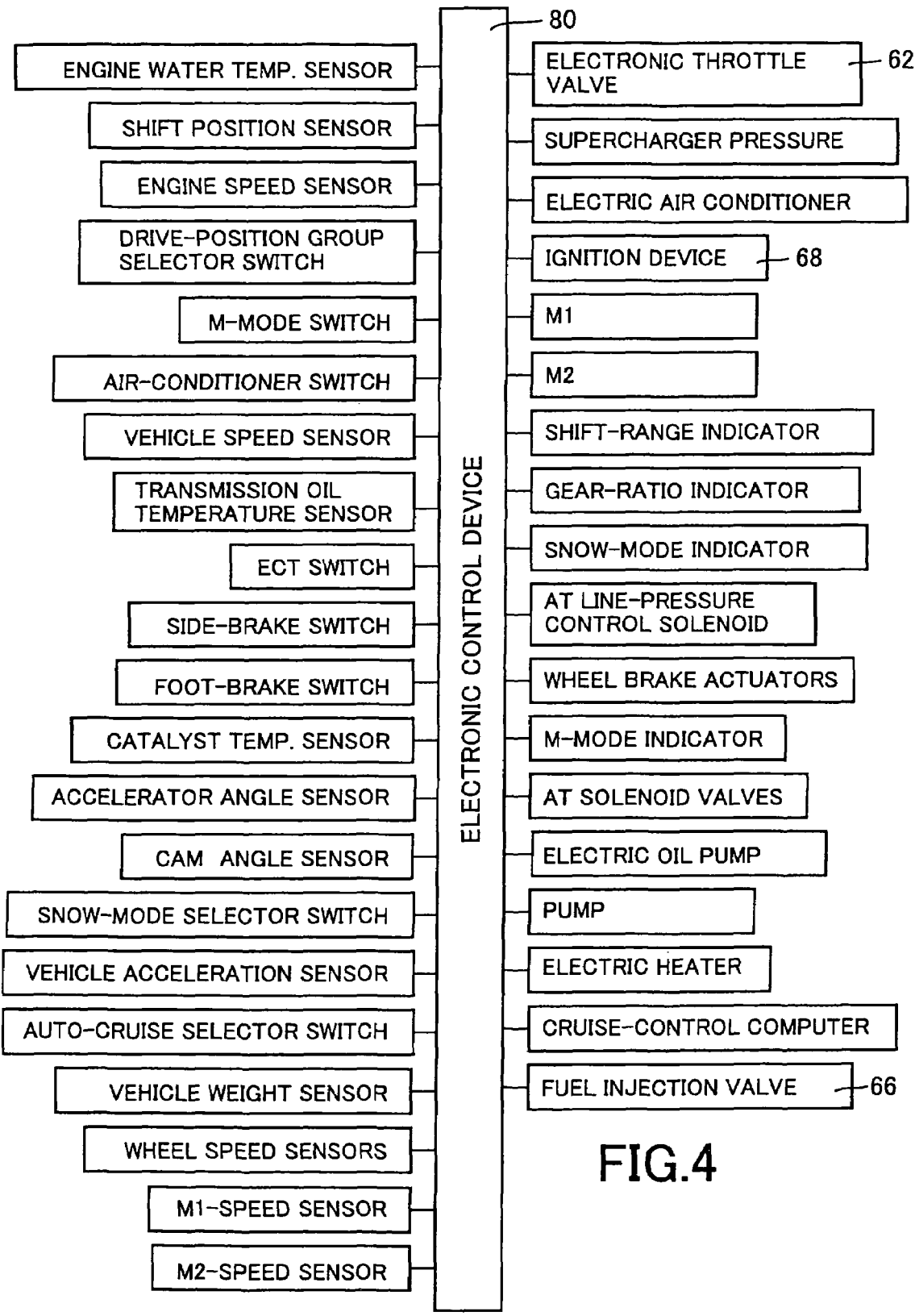
FIG. 4 is a view indicating input and output signals of an electronic control device serving as the control apparatus according to the embodiment of this invention to control the power transmitting system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature $T_{OIL}$ of a working fluid or oil of the automatic transmission portion 20 (hereinafter referred to as "working fluid temperature $TH_{ATF}$"); a signal indicative of an operated state of a side brake; a signal indicative of an operated state of a foot brake; a signal indicative of a temperature of a catalyst; a signal indicative of a required amount of an output of the vehicle in the form of an amount of operation (an angle of operation) $A_{CC}$ of a manually operable vehicle accelerating member in the form of an accelerator pedal 74 (shown in FIG. 7), which is detected by an accelerator sensor 72; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the wheels of the vehicle; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an amount of electric energy SOS stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate actuators for wheel brakes 86 (shown in FIG. 7); a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; and a signal to drive an electric heater; a signal to be applied to a cruise-control computer.

Figure 5:
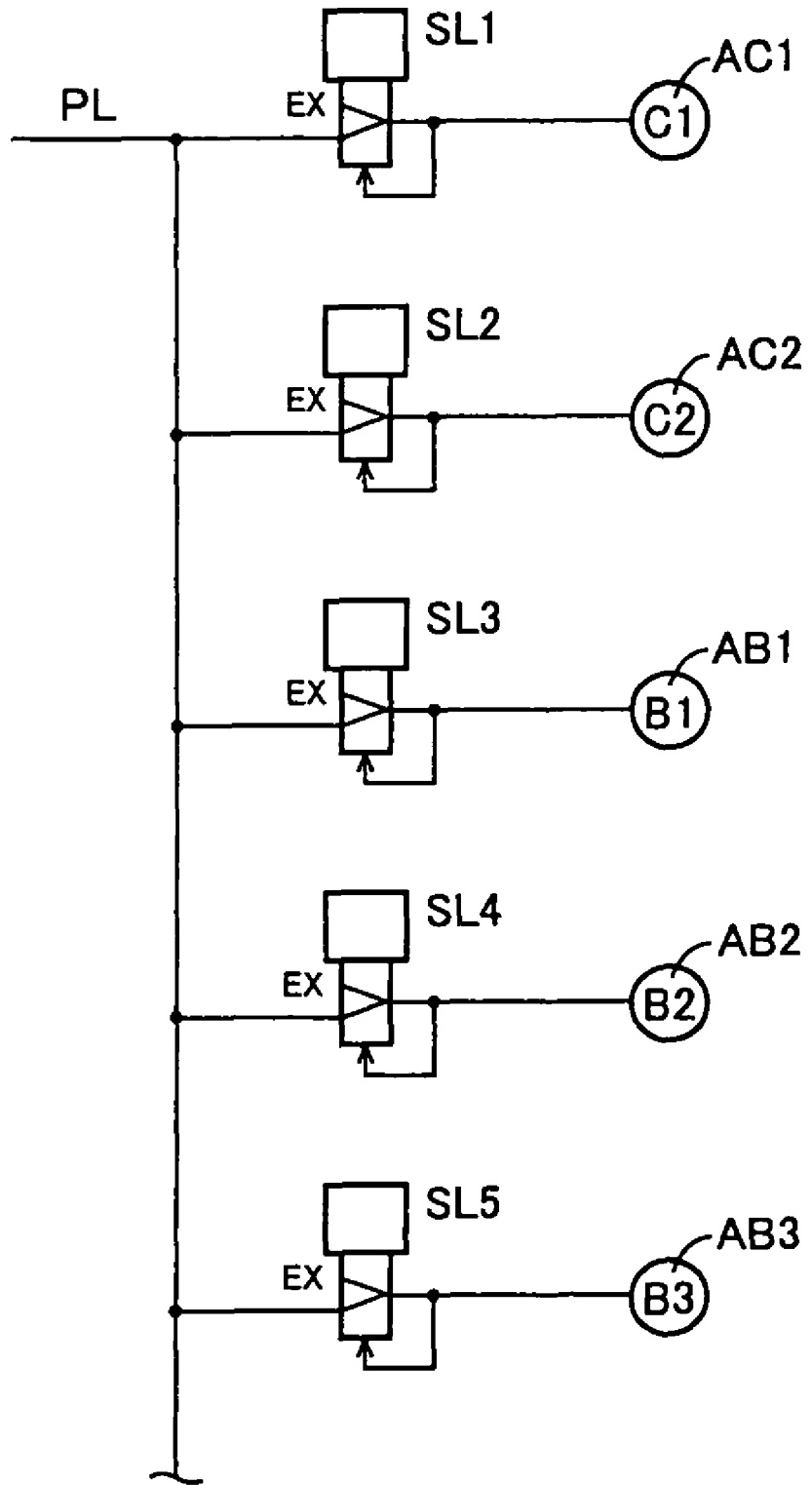
FIG. 5 is a circuit diagram showing hydraulic actuators provided in a hydraulic control unit, for operating clutches and brakes incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
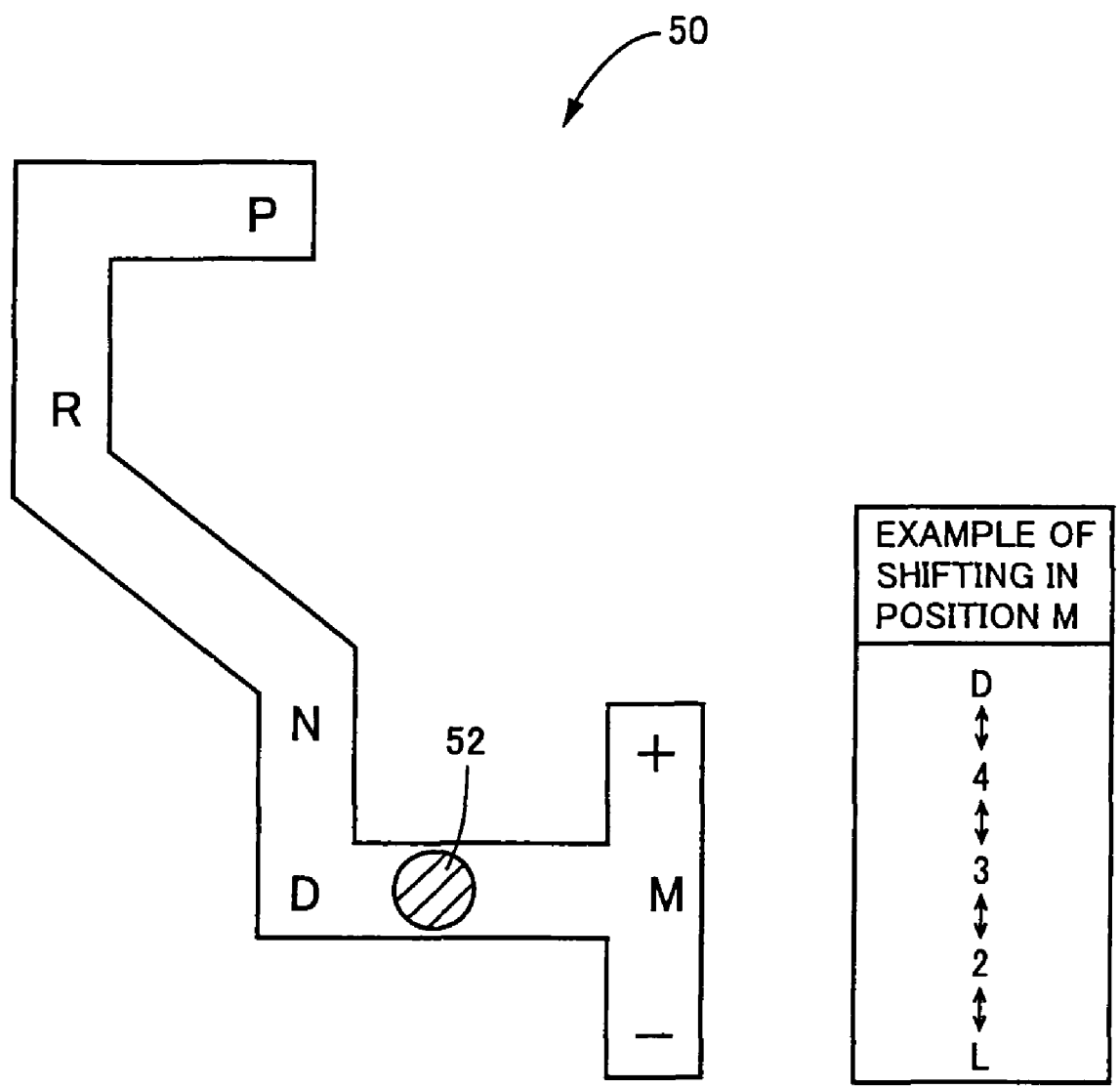
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of a parking position P for placing the transmission mechanism 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the transmission mechanism 10 in the neutral state; an automatic forward-drive shifting position D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Referring to the functional block diagram of FIG. 7, the electronic control device 80 includes a step-variable shifting control portion 82, a hybrid control portion 84, a coasting-shift-down control portion 100, an accelerator-operation-amount determining portion 102, and a compensating portion 108. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the actual rotating speed $N_{OUT}$ of the output shaft 20 and the actual operation amount $A_{CC}$ of the accelerator pedal 74, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio $\gamma 0$ of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal 74 used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Figure 9:
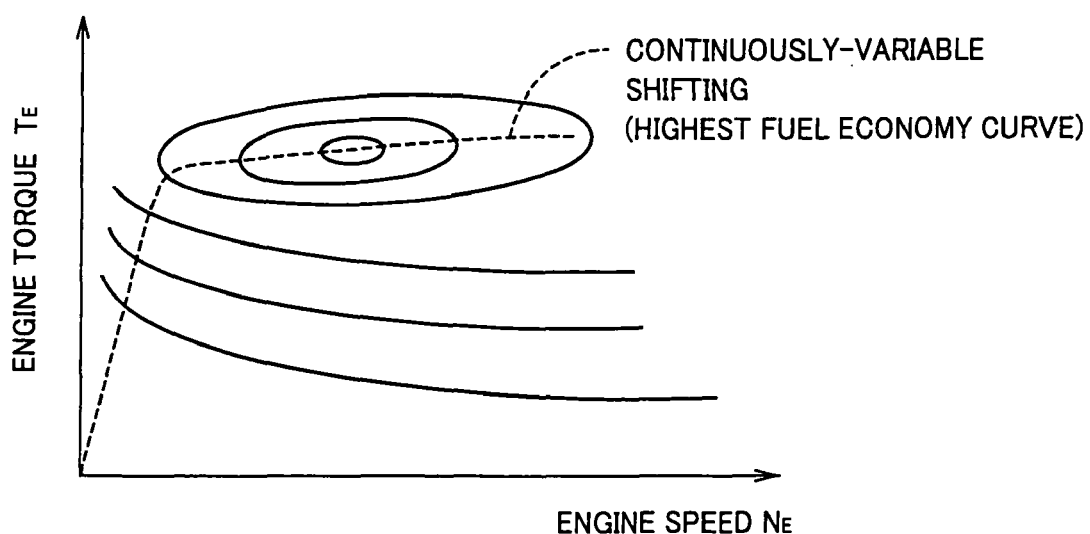
FIG. 9 is a view illustrating an example of a fuel consumption map defining a highest-fuel-economy curve of an engine (indicated by broken line)

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio $\gamma T$ of the transmission mechanism 10, so that the engine 8 is operated according to a stored highest-fuel-economy curve (fuel-economy map or relation) indicated by broken line in FIG. 9. The target value of the overall speed ratio $\gamma T$ of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio $\gamma 0$ of the differential portion 11, so as to obtain the target value of the overall speed ratio $\gamma T$, so that the overall speed ratio $\gamma T$ can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the power transmitting system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant.

To raise the engine speed $N_E$ during running of the vehicle, for example, the hybrid control portion 84 raises the first electric motor speed $N_{M1}$ while the second electric motor speed $N_{M2}$ determined by the vehicle speed V (rotating speed of the drive wheels 34) is held substantially constant, as is apparent from the collinear chart of FIG. 3. To hold the engine speed $N_E$ substantially constant during a shifting action of the automatic transmission portion 20, the hybrid control portion 84 changes the first electric motor speed $N_{M1}$ in a direction opposite to a direction of change of the second electric motor speed $N_{M2}$ due to the shifting action of the automatic transmission portion 20.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. For example, the hybrid control portion 84 establishes the motor-drive mode, when the operating efficiency of the engine 8 is relatively low, or when the vehicle speed V is comparatively low or when the vehicle is running in a low-load state. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 functions as regeneration control means for operating the second electric motor M2 as the electric generator with a kinetic energy of the running vehicle, that is, with a drive force transmitted from the drive wheels 34 toward the engine 8, during coasting of the vehicle with the accelerator pedal 74 placed in the non-operated position, or during brake application to the vehicle with the hydraulically operated wheel brakes 86 for the drive wheels 34, which are shown in FIG. 7. An electric energy generated by the second electric motor M2 is stored in the electric-energy storage device 56 through the inverter 54, for improving the fuel economy of the vehicle. The amount of electric energy to be generated by the second electric motor M2 is determined on the basis of the electric energy amount SOC stored in the electric-energy storage device 56, and a desired proportion of a regenerative braking force produced by the second electric motor M2 operated as the electric generator, with respect to a total braking force which corresponds to the operating amount of a brake pedal and which consists of the regenerative braking force and a hydraulic braking force produced by the hydraulically operated wheel brakes 86.

When a shift-down action of the automatic transmission portion 20 takes place during coating of the vehicle with the accelerator pedal 74 placed in the non-operated position, the second electric motor M2 is controlled to raise the input speed of the automatic transmission portion 20 to a synchronizing speed of the gear position to be established by the shift-down action, for the purpose of reducing the shift-down shock. To implement this synchronizing control of the input speed of the automatic transmission portion 20, the automatic transmission portion 20 must be temporarily placed in its neutral position. In the neutral position, the automatic transmission 20 is disconnected from the drive wheels 34 driven by the kinetic energy of the coasting vehicle, so that deceleration of the vehicle is temporarily interrupted, so that the vehicle operator may recognize the interrupted deceleration of the vehicle unexpectedly during the coasting run of the vehicle. The input speed of the automatic transmission portion 20 may be considered equivalent to the output speed of the differential portion 11. That is, the input speed of the automatic transmission portion 20 is the rotating speed of the power transmitting member 18, which functions as the input shaft of the automatic transmission portion 20 and the output shaft of the differential portion 11.

To reduce the temporary interruption of deceleration of the vehicle in the process of a shift-down action of the automatic transmission portion 20 while at the same time reducing the shift-down shock during coasting of the vehicle, the coasting-shift-down control portion 100 described above is configured to implement the required coasting shift-down action of the automatic transmission portion 20 during a coasting run of the vehicle only when a parameter correlating with the output shaft torque $T_{OUT}$ during the coasting run of the vehicle is held within a predetermined range. As indicated in FIG. 7, the coasting-shift-down control portion 100 includes a coasting-shift-down determining portion 104, a reference-vehicle-speed changing portion 106, a compensating portion 109 and a synchronization control portion 110. There will be described an operation of the coasting-shift-down control portion 100, and operations of the accelerator-operation-amount determining portion 102 and compensation-control feasibility determining portion 108 described above. In the present embodiment, the vehicle speed V represented by the rotating speed $N_{OUT}$ of the output shaft 22 of the automatic transmission portion 20 is used as the parameter correlating with the output shaft torque $T_{OUT}$ of the automatic transmission portion 20. However, other parameters such as the vehicle deceleration value and the output shaft torque actually detected by a torque sensor may be used as the parameter correlating with the output shaft torque $T_{OUT}$, for controlling the coasting shift-down actions of the automatic transmission portion 20.

The accelerator-operation-amount determining portion 102 is configured to determine whether the operation amount $A_{CC}$ of the accelerator pedal 74 is zero. The operation amount $A_{CC}$ is detected on the basis of an output signal of the accelerator sensor 72. If an affirmative determination is obtained by the accelerator-operation-amount determining portion 102 is obtained, that is, if the accelerator pedal 74 is placed in its non-operated position with the operation amount $A_{CC}$ being held at zero, this means that the vehicle is coasting without an operation of the accelerator pedal 74.

The above-indicated coasting-shift-down determining portion 104 is configured to determine whether a shift-down action of the automatic transmission portion 20 should be performed, that is, initiated in the coasting state of the vehicle. This determination is made by determining whether the deceleration value of the vehicle has lowered to a predetermined threshold, that is, whether a shift-down point at which the shift-down action should be initiated is reached. This determination is determined by determining whether the actual vehicle speed V has been lowered to a predetermined reference speed $V_{ST}$. This reference vehicle speed $V_{ST}$ is obtained by experimentation or theoretically such that the deceleration value is zero or close to zero at the reference vehicle speed $V_{ST}$, that is, the vehicle drive force is zero (0 Nm) or close to zero at the reference vehicle speed $V_{ST}$. The obtained reference vehicle speed $V_{ST}$ is stored in a memory. When the coasting-shift-down determining portion 104 has determined that the vehicle speed V has been lowered to the reference value $V_{ST}$, the coasting-shift-down control portion 100 initiates the required (commanded) shift-down action of the automatic transmission portion 20

Figure 8:
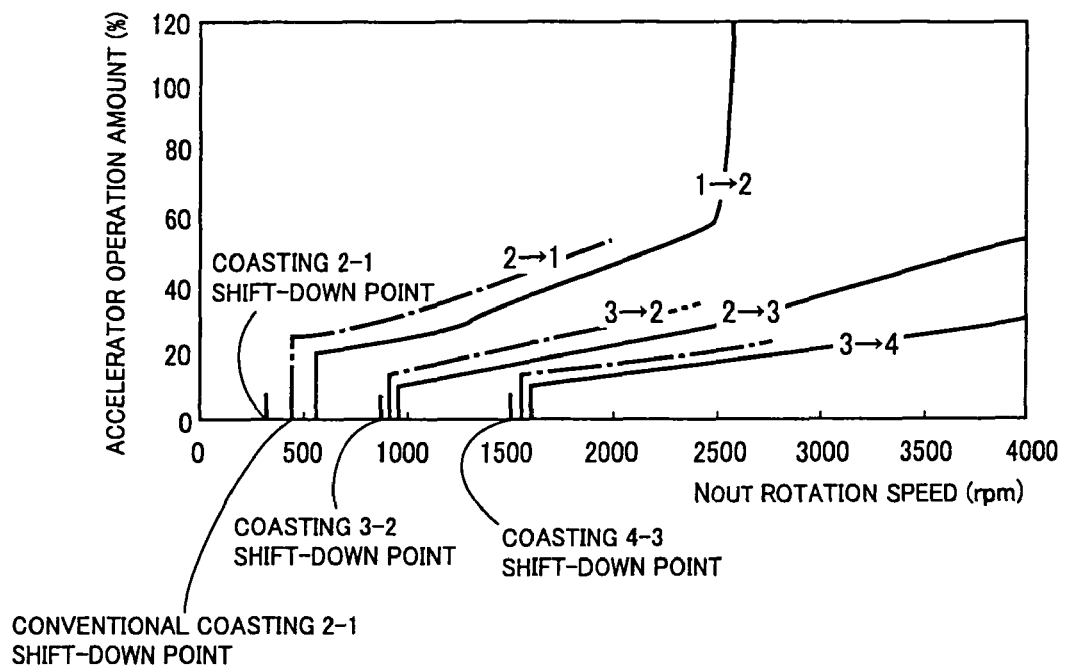
FIG. 8 is a view illustrating an example of a stored shifting boundary line map used for determining a shifting action of the automatic transmission portion, and indicating normal coating-shift-down speed points at which shift-down actions of the automatic transmission portion take place during coasting of the hybrid vehicle.

The reference vehicle speed $V_{ST}$ for each coasting shift-down action of the automatic transmission portion 20 corresponds to the coasting shift-down point in FIG. 8. Namely, the vehicle running speed V is calculated from the rotating speed $N_{OUT}$ of the output shaft 22 of the automatic transmission portion 20, so that the reference vehicle speed $V_{ST}$ for each shift-down action can be obtained on the basis of the corresponding coasting shift-down point of the speed $N_{OUT}$ of the output shaft 22. It is noted that the coasting shift-down point corresponding to the reference vehicle speed $V_{ST}$ is different from a conventional shift-down point when the operation amount $A_{CC}$ of the accelerator pedal 74 is zero. The conventional shift-down point is defined by a conventional shift-down boundary line represented by one-dot chain line in FIG. 8. For example, the conventional shift-down boundary line for the 2-1 shift-down action of the automatic transmission portion 20 from the second gear position to the first gear position is formulated to initiate the 2-1 shift-down action at the same shift-down point of the output speed $N_{OUT}$ as long as the operation amount $A_{CC}$ is in a range of 0-25%. According to the coasting-shift-down control portion 100, however, the 2-1 shift-down action during coasting of the vehicle is initiated at the predetermined coasting 2-1 shift-down point corresponding to the operation amount $A_{CC}$ of zero, which shift-down point is lower than the conventional shift-down point corresponding to the operation amount $A_{CC}$ of zero, as is apparent from FIG. 8. If the coasting shift-down action was initiated at the conventional shifting-down point corresponding to the operation amount $A_{CC}$ of zero, the deceleration value of the vehicle in its coasting state would be still higher the predetermined threshold indicated above with respect to the coasting-shift-down determining portion 104, so that the deceleration of the vehicle is temporarily interrupted in the neutral state of the automatic transmission portion 20 which is temporarily established in the process of the shift-down action for synchronization of its input speed. When the coasting shift-down action is initiated at the coasting shift-down point of the output speed $N_{OUT}$ corresponding to the predetermined reference vehicle speed $V_{ST}$ according to the principle of this invention, the possibility of the temporary interruption of the vehicle deceleration in the process of the shift-down action is reduced since the vehicle deceleration value upon initiation of the shift-down action is zero or close to zero.

Figure 10:
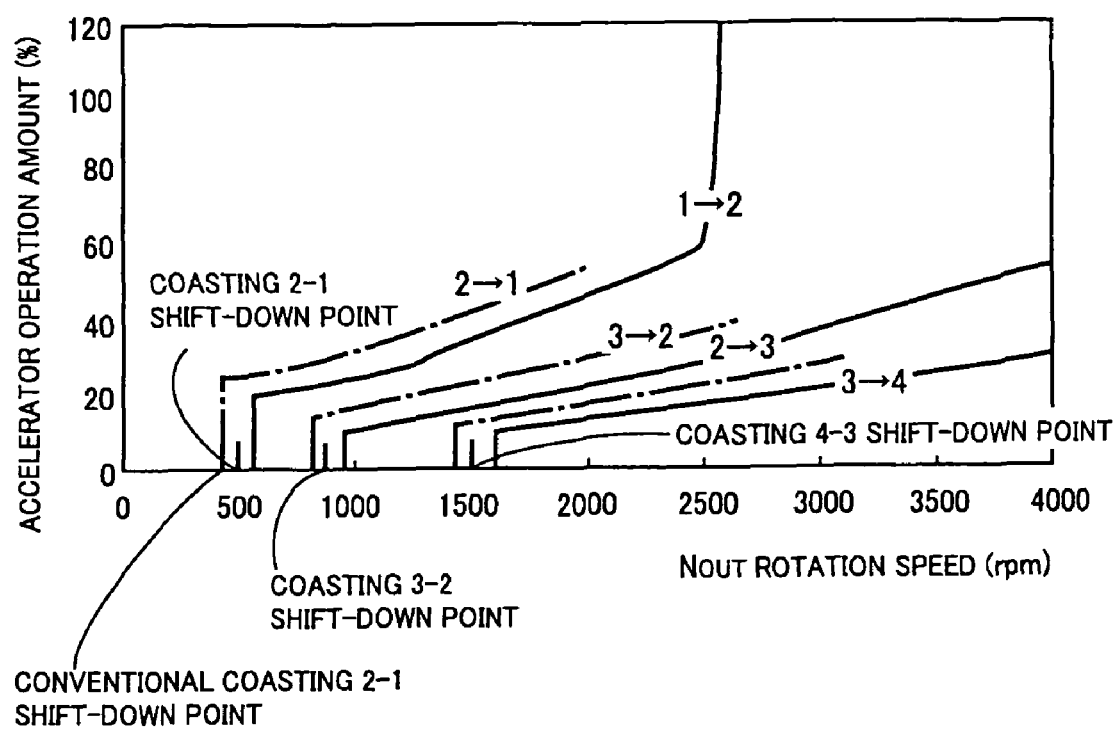
FIG. 10 is a view illustrating an example of another shifting boundary line map, and indicating raised coasting-shift-down speed points.

The reference vehicle speed $V_{ST}$ is changed by the above-indicated reference-vehicle-speed changing portion 106, depending upon whether the wheel brakes 86 provided for the drive wheels 34 can be operated. That is, the reference-vehicle-speed changing portion 106 changes the reference vehicle speed $V_{ST}$ on the basis of a result of determination by the above-indicated compensation-control feasibility determining portion 108. The compensation-control feasibility determining portion 108 is configured to determine whether the wheel brakes 86 for the drive wheels 34 can be operated to decelerate the vehicle. If a negative determination is obtained by the compensation-control feasibility determining portion 108, that is, if the wheel brakes 86 cannot be operated to decelerate the vehicle, the required shift-down action of the automatic transmission portion 20 is initiated at the normal coating shift-down point (normal reference speed $V_{ST}$) indicated in FIG. 8. If an affirmative determination is obtained by the compensation-control feasibility determining portion 108 is obtained, that is, if the wheel brakes 86 can be operated to decelerate the vehicle, the above-indicated reference-vehicle-speed changing portion 106 changes the reference vehicle speed $V_{ST}$ (coasting shift-down point) for the required coasting shift-down action from the normal value of FIG. 8 to a high value indicated in FIG. 10, which is higher than the normal value of FIG. 8. The high coasting shift-down point of FIG. 10 for each coasting shift-down action is obtained by experimentation or theoretically so that the required coasting shift-down action is initiated at the higher reference vehicle speed $V_{ST}$ than when the normal coasting shift-down point is selected. The negative determination is obtained by the compensation-control feasibility determining portion 108, when the wheel brakes 86 are not normally operable due to a detect of their hydraulic actuator or actuators.

When the affirmative determination is obtained by the compensation-control feasibility determining portion 108, the reference-vehicle-speed changing portion 106 selects the higher reference vehicle speed $V_{ST}$ (high coasting shift-down point) at which the required coasting shift-down action is initiated. In this case, the temporary interruption of deceleration of the vehicle is prevented or reduced by the braking operation of the wheel brakes 86 under the control of the above-indicated compensating portion 109.

Described in detail, the compensating portion 109 is configured to actuate the wheel brakes 86 to decelerate the vehicle running in the coasting state. A braking force to be generated by the wheel brakes 86 under the control of the compensating portion 109 is determined by experimentation or theoretically such that the temporary interruption of the vehicle deceleration which takes place when the automatic transmission portion 20 is temporarily placed in the neutral state in the process of the required coasting shift-down action is compensated for by the braking force generated by the wheel brakes 86. Accordingly, the possibility of the temporary interruption of the vehicle deceleration in the process of the required coasting shift-down action of the automatic transmission portion 20 is reduced even when the coasting shift-down action is initiated at the high reference vehicle speed $V_{ST}$ (high coasting shift-down point). Further, the initiation of the coasting shift-down action at the high reference vehicle speed $V_{ST}$ causes the output shaft of the differential portion 11 in the form of the power transmitting member 18 to be rotated at a higher speed after completion of the shift-down action, than when the coasting shift-down action is initiated at the normal reference vehicle speed $V_{ST}$. Accordingly, the second electric motor M2 connected to the power transmitting member 18 is rotated at the higher speed, so that the amount of electric energy regenerated by the second electric motor M2 is increased.

The reference-vehicle-speed changing portion 106 may be modified to change the reference vehicle speed $V_{ST}$ depending upon a gradient of the roadway on which the vehicle is coasting. The gradient of the roadway can be calculated on the basis of the operation amount $A_{CC}$ of the accelerator pedal 74, vehicle speed V and longitudinal acceleration value G of the vehicle. When the vehicle is coasting on an uphill roadway, the vehicle deceleration value is higher than when the vehicle is coasting on a downhill roadway. Therefore, the reference vehicle speed $V_{ST}$ is set to the high value (higher than the normal value) when the vehicle is running on an uphill roadway (having a gradient higher than a predetermined threshold), and is set to the normal value when the vehicle is coasting on a downhill roadway.

The above-indicated synchronization control portion 110 is configured to implement a synchronizing control of the input shaft speed of the automatic transmission portion 20 in the process of the required coasting shift-down action, that is, a synchronizing control of the rotating speed $N_{18}$ of the power transmitting member 18, by controlling the second electric motor M2 connected to the power transmitting member 18. Described more specifically, the operating speed of the second electric motor M2 is controlled such that the rotating speed $N_{18}$ of the power transmitting member 18 synchronized with the input speed of the automatic transmission portion 20 which is expected to be established after completion of the required coasting shift-down action of the automatic transmission portion 20. It is noted that the input speed of the automatic transmission portion 20 expected after completion of the coasting shift-down action is a product of the speed $N_{OUT}$ of the output shaft 22 of the automatic transmission portion 20 and the speed ratio of the gear position to be established after completion of the coasting shift-down action. As indicated above, this synchronizing control is implemented in the neutral state of the automatic transmission portion 20, which is temporarily established in the process of the coasting shift-down action.

Referring next to the flow chart of FIG. 11, there will be described a control routine executed by the electronic control device 80 to reduce not only a shift-down shock of the automatic transmission portion 20, but also a possibility of temporary interruption of deceleration of the vehicle in the process of a required coasting shift-down action of the automatic transmission portion 20. This control routine is repeatedly executed with an extremely short cycle time of about several milliseconds to about several tends of milliseconds. In the specific example illustrated in the flow chart of FIG. 11, the automatic transmission portion 20 is commanded to be shifted down from the second gear position to the first gear position during coasting of the vehicle while the vehicle is running in the motor drive mode.

Figure 11:
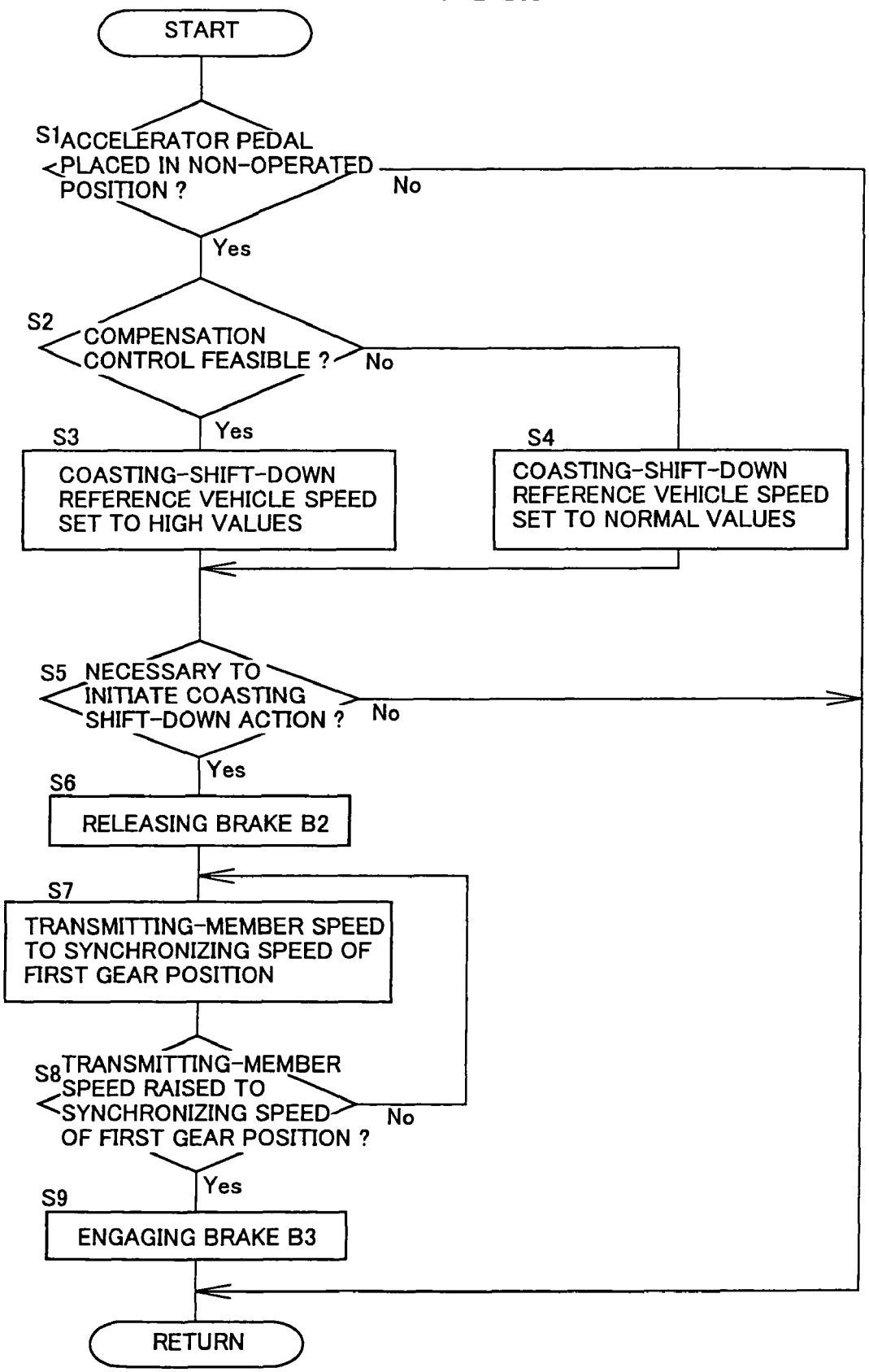

The control routine of FIG. 11 is initiated with step S1 corresponding to the accelerator-operation-amount determining portion 102, to determine whether the accelerator pedal 74 is placed in its non-operated position, that is, whether the operation amount $A_{CC}$ of the accelerator pedal 74 is zero. If a negative determination is obtained in step S1, the control routine is terminated. If an affirmative determination is obtained in step S1, the control flow goes to step S2 corresponding to the compensation-control feasibility determining portion 18, to determine whether the wheel brakes 86 can be operated to decelerate the vehicle. If a negative determination is obtained in step S2, the control flow goes to step S4 corresponding to the reference-vehicle-speed changing portion 106, to set the reference vehicle speed $V_{ST}$ to the normal values of FIG. 8. If an affirmative determination is obtained in step S2, the control flow goes to step S3 also corresponding to the reference-vehicle-speed changing portion 106, to set the reference vehicle speed $V_{ST}$ to the higher values of FIG. 10. Steps S3 and S4 are followed by step S5 corresponding to the coasting-shift-down determining portion 104, to determine whether the coasting 2-1 shift-down action of the automatic transmission portion 20 should be initiated. If a negative determination is obtained in step S5, the present control routine is terminated. If an affirmative determination is obtained in step S5, that is, if the vehicle speed V has been lowered to the reference vehicle speed $V_{ST}$, the control flow goes to step S6 the required coasting shift-down action of the automatic transmission portion 20 is initiated. The initiation of the coasting 2-1 shift-down action at the reference vehicle speed $V_{ST}$ makes it possible to reduce the possibility of temporary interruption of deceleration of the coasting vehicle in the neutral state of the automatic transmission portion 20 which is temporarily established in the process of the coasting 2-1 shift-down action.

The control flow then goes to step S6 corresponding to the coasting-shift-down control portion 106, the hydraulic pressure of the second brake B2 to be released to perform the coasting 2-1 shift-down action of the automatic transmission portion 20 is lowered so that the brake B2 is fully released, whereby the automatic transmission portion 20 is placed in the neutral state. Since the deceleration value of the vehicle and the vehicle drive force at the reference vehicle speed $V_{ST}$ is almost zero, the possibility of temporary interruption of deceleration of the vehicle in the neutral state of the automatic transmission portion 20 is reduced, so that the vehicle operator will not feel the temporary interruption of the vehicle deceleration in the process of the coasting 2-1 shifting action. Where the reference vehicle speed $V_{ST}$ for initiating the coasting 2-1 shift-down action is set to the high value in step S3, the wheel brakes 86 are operated under the control of the compensating portion 109 to decelerate the vehicle prior to the initiation of the coasting 2-1 shift-down action, so that the possibility of the temporary interruption of the vehicle deceleration in the neutral state of the automatic transmission portion 20 is effectively reduced, even though the shift-down action is initiated at the comparatively high reference vehicle speed $V_{ST}$.

Then, the control flow goes to step S7 corresponding to the synchronization control portion 110, to initiate the synchronization control in which the rotating speed $N_{18}$ of the power transmitting member 18 is raised to the synchronizing speed of the first gear position to be established after the coasting 2-1 shift-down action of the automatic transmission portion 20. Step S7 is followed by step S8 also corresponding to the synchronization control portion 110, to determine whether the rotating speed $N_{18}$ of the power transmitting member 18 has been raised to the synchronizing speed of the first gear position. If an affirmative determination is obtained in step S8, the control flow goes back to step S7. Steps S7 and S8 are repeatedly implemented until an affirmative determination is obtained in step S8. That is, the synchronization control is implemented until the rotating speed $N_{18}$ of the power transmitting member 18 has become equal to the synchronizing speed of the first gear position.

The control flow then goes to step S9 corresponding to the coasting-shift-down control portion 100, in which the hydraulic pressure of the third brake B3 to be engaged to perform the 2-1 shift-down action is increased so that the third brake B3 is fully engaged to establish the first gear position, that is, to place the automatic transmission portion 20 in the first gear position. Since the rotating speed $N_{18}$ of the power transmitting member 18 and the input speed of the automatic transmission portion 20 have already been synchronized with each other, the 2-1 shift-down shock is effectively reduced.

Figure 12:
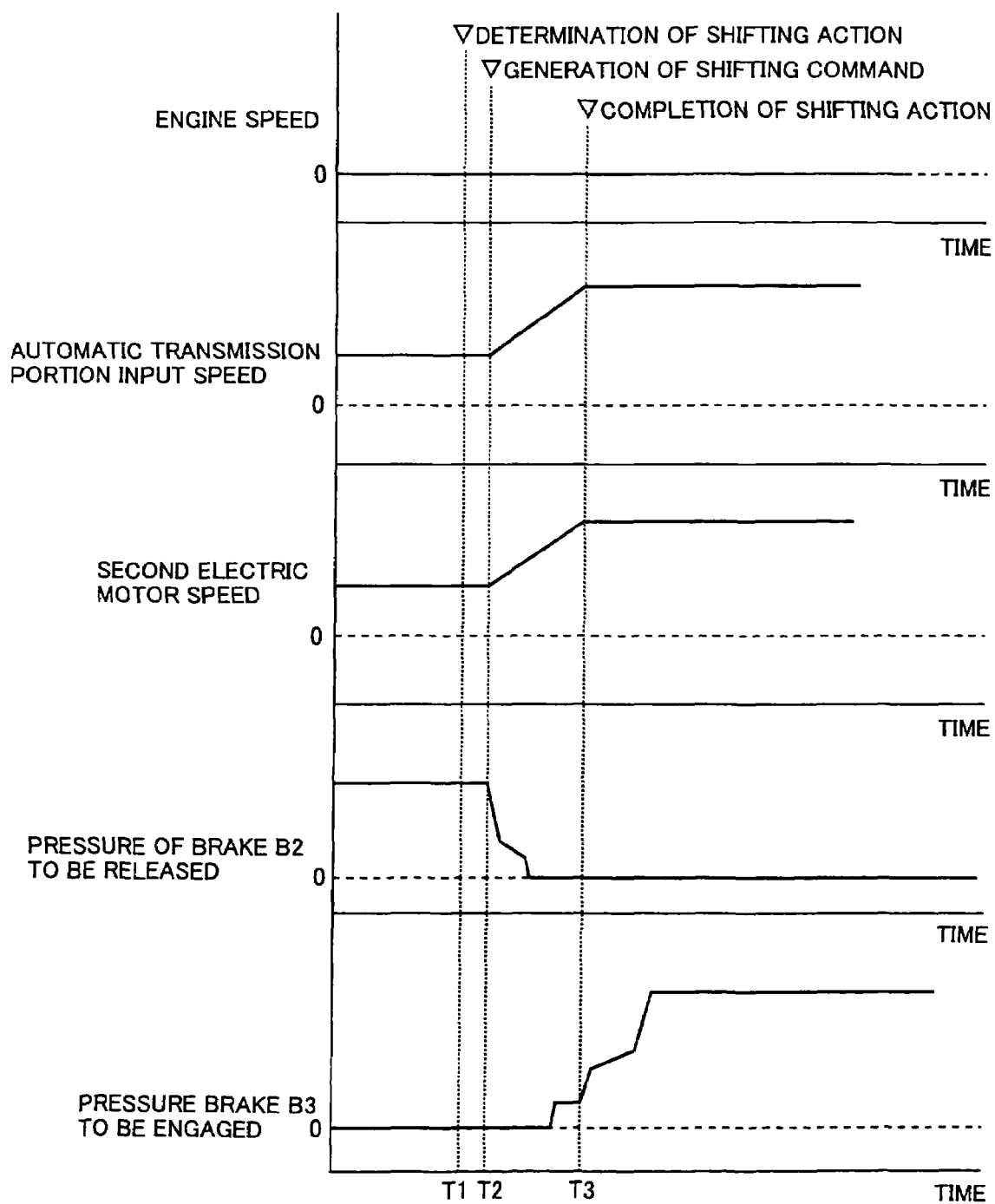
FIG. 12 is a time chart indicating changes of various parameters when a shift-down action of the automatic transmission portion takes place during coasting of the vehicle in a motor drive mode.

The time chart of FIG. 12 indicates changes of various parameters when the 2-1 shift-down action of the automatic transmission portion 20 is performed during coasting of the vehicle in the motor drive mode.

In the example of the time chart of FIG. 12, the coasting shift-down determining portion 104 determines at a point of time T1 that the coasting 2-1 shift-down action of the automatic transmission 20 should be initiated, and the releasing action of the second brake B2 which is to be released to perform the 2-1 shift-down action is initiated at a point of time T2 according to a shifting command. During a following time period from the point of time T2 to a point of time T3, the rotating speed $N_{18}$ of the power transmitting member 18 is raised to the synchronizing speed of the first gear position, by controlling the speed NM2 of the second electric motor M2. When the rotating speed $N_{18}$ has been raised to the synchronizing speed, the engaging action of the third brake B3 which is to be engaged to perform the 2-1 shift-down action is initiated at the point of time T3, so that the coasting 2-1 shift-down action is completed, namely, the automatic transmission portion 20 has been placed in the first gear position when the third brake B3 is fully engaged. Thus, the third brake B3 is fully engaged after the rotating speed $N_{18}$ of the power transmitting member 18 has been synchronized with the synchronizing speed, so that the coasting 2-1 shift-down shock of the automatic transmission portion 20 is reduced. Where the affirmative determination is obtained by the compensation-control feasibility determining portion 108, the wheel brakes 86 are activated during a drop of the second brake B2 under the control of the compensating portion 109, to reduce or present the temporary interruption of the vehicle deceleration when the automatic transmission portion 20 is temporarily placed in the neutral position with the second brake B2 placed in the released state.

The control apparatus in the form of the electronic control device 80 according to the present embodiment includes the coasting-shift-down control portion 100 configured to implement a coasting shift-down action of the automatic transmission portion 20 during a coasting run of the vehicle, only when the parameter correlating with the shaft torque $T_{OUT}$ of the automatic transmission portion 20 during the coasting run is held within a predetermined range. Accordingly, the coasting shift-down action takes place only when the parameter correlating to the shaft torque $T_{OUT}$ of the automatic transmission portion 20 is held within the predetermined range. The coasting-shift-down control portion 100 permits effective reduction of the possibility of temporary interruption of deceleration of the vehicle in the process of the coasting shift-down action of the automatic transmission portion 20.

The present embodiment is further configured such that the predetermined reference value $V_{ST}$ of the vehicle running speed V is stored in the memory of the coasting-shift-down control portion 100, as an upper limit of the vehicle running speed V at or below which the shaft torque $T_{OUT}$ of the automatic transmission portion 20 is smaller than the predetermined upper limit. The coasting-shift-down control portion 100 implements the coasting shift-down action of the automatic transmission portion 20 when the actual running speed V of the vehicle has been lowered to the predetermined reference value $V_{ST}$; Accordingly, the shaft torque $T_{OUT}$ of the automatic transmission portion 20 is limited to its upper limit in the process of the coasting shift-down action, so that the possibility of the temporary interruption of deceleration of the vehicle in the process of the coasting shift-down action of the automatic transmission portion 20 is effectively reduced.

The coasting-shift-down control portion 100 according to the present embodiment includes the synchronization control portion (110) configured to implement the synchronization control of the input shaft speed of the automatic transmission portion 20 in the process of the coasting shift-down action, for reducing the shift-down shock of the automatic transmission portion 20.

The synchronization control portion 110 provided according to the present embodiment can rapidly implement the synchronization control of the input shaft speed of the automatic transmission portion 20 by an electric control of the second electric motor M2 which is operatively connected to the power transmitting member 18 which functions as the output shaft of the electrically controlled differential portion 11.

The present embodiment is further arranged such that the vehicle is decelerated by the compensating portion 109 in the process of the coasting shift-down action of the automatic transmission portion 20 when the compensating portion 109 is normally operable, so that a possibility of temporary interruption of deceleration of the coasting vehicle in the process of the coasting shift-down action can be reduced owing to the vehicle deceleration by the compensating portion 109, even if the coasting shift-down action is initiated at the predetermined higher running speed of the vehicle. Further, the initiation of the coasting shift-down action at the higher running speed of the vehicle permits an operation of the second electric motor M2 as an electric generator at a comparatively high speed, so that the second electric motor M2 regenerates a comparatively large amount of electric energy.

Further, the illustrated embodiment is configured such that the vehicle is decelerated by the wheel brakes 86 in the process of the coasting shift-down action of the automatic transmission portion 20 under the control of the compensating portion 109. Thus, the compensating portion 109 does not require a device exclusively provided for decelerating the vehicle in the process of the coasting shift-down action of the automatic transmission portion 20, for reducing the possibility of temporary interruption of deceleration of the vehicle when the automatic transmission portion 20 is placed in the neutral state in the process of the coasting shift-down action.

In addition, the present embodiment is arranged such that the automatic transmission portion 20 is placed in its neutral state during the synchronization control implemented by the synchronization control portion 110, so that the shaft speed of the automatic step-variable transmission portion 20 can be rapidly synchronized in the neutral state in which the automatic transmission portion 20 is disconnected from the drive wheels 34 driven by a kinetic energy of the coasting vehicle.

This embodiment is also configured such that the electrically controlled differential portion 11 is operable as a continuously-variable transmission mechanism by controlling the first electric motor M1, so that the overall speed ratio of the transmission mechanism 10 can be smoothly and continuously changed. However, the electrically controlled differential portion 11 is also operable as a step-variable transmission mechanism the speed ratio of which is variable in steps, so that the overall speed ratio of the transmission mechanism 10 can be rapidly changed in steps.

The illustrated embodiment is further arranged such that the reference-vehicle-speed changing portion 106 changes the reference value $V_{ST}$ of the running speed V depending upon the gradient of the roadway on which the vehicle is running in the coasting state. The reference-vehicle-speed changing portion 106 permits a coasting shift-down action of the automatic transmission portion 20 to be initiated at a suitable point of time depending upon the gradient of the roadway, for reducing the possibility of the temporary interruption of deceleration of the vehicle in the process of the coasting shift-down action.

While the preferred embodiment of this invention has been described in detail by reference to the accompanying drawings, it is to be understood that the present invention may be otherwise embodied.

The illustrated embodiment has been described in connection with the coasting 2-1 shift-down action of the automatic transmission portion 20 from the second gear position to the first gear position. However, the principle of the present invention is equally applicable to other coasting shift-down actions such as the 3-2 shift-down action from the third gear position to the second gear position. In this connection, it is noted that the deceleration value of the vehicle decreases with a decrease of the speed ratio of the gear position from which the automatic transmission portion 20 is shifted down. In this sense, the coasting-shift-down control portion 100 according to the principle of the present invention need not control the shift-down actions from the gear positions having relatively low speed ratios, such as the 4-3 shift-down action.

In the illustrated embodiment, the vehicle running speed V is used as the parameter correlating to the output shaft torque $T_{OUT}$ of the automatic transmission portion 20. However, other parameters such as the vehicle deceleration value and the output shaft torque actually detected by a torque sensor may be used as the parameter correlating with the output shaft torque $T_{OUT}$, for controlling the coasting shift-down actions of the automatic transmission portion 20. For example, the required coasting shift-down action of the automatic transmission portion 20 is implemented by the coasting-shift-down action control portion 100 when the vehicle deceleration value detected by an acceleration sensor or the shaft torque detected by a torque sensor is held within a predetermined range in which the temporary interruption of deceleration of the vehicle in the process of the coasting shift-down action can be reduced or prevented.

In the illustrated transmission mechanism 10, the second electric motor M2 is connected directly to the power transmitting member 18. However, the second electric motor M2 may be connected to any portion of the power transmitting path between the differential portion 11 and the drive wheels 34, either directly or indirectly through a suitable transmission device.

Although the differential portion 11 functions as an electrically controlled continuously variable transmission the gear ratio $\gamma 0$ of which is continuously variable from the minimum value $\gamma 0_{min}$ to the maximum value $\gamma 0_{max}$, the differential portion 11 may be modified such that its speed ratio $\gamma 0$ is not variable continuously, but is variable in steps by utilizing its differential function. The present invention is applicable to a hybrid vehicle power transmitting system including the differential portion modified as described above.

Further, the differential portion 11 in the illustrated transmission mechanism 10 may be provided with a differential limiting device which is incorporated in the power distributing mechanism 16 and which is operable as a step-variable transmission having two forward-drive positions by limiting the differential function of the differential portion 11.

In the power distributing mechanism 16 in the illustrated transmission mechanism 10, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the first sun gear S1 while the second electric motor M2 is connected to the power transmitting member 18. However, this arrangement is not essential. For instance, the first electric motor M1 may be operatively connected to the first sun gear S1 through gears, a belt or a speed reduction device, while the second electric motor M2 may be connected to the power transmitting member 18.

The hydraulically operated frictional coupling devices such as the first and second clutches C1, C2 in the illustrated transmission mechanism 10 may be replaced by coupling devices of magnetic powder type, electromagnetic type and mechanical type, such as powder clutches, electromagnetic clutches, meshing-type dog clutches. Where the electromagnetic clutches are used, the switching valve devices incorporated in the hydraulic control unit 70 are replaced by a switching device for controlling electric control signals for selectively energizing and de-energizing solenoids of the electromagnetic clutches, for example.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the differential mechanism in the form of the power distributing mechanism 16 provided in the illustrated embodiment may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the power distributing mechanism 16 is constituted by two or more planetary gear sets, the engine 8, first and second electric motors M1, M2 and power transmitting member 18 are operatively connected to respective rotary elements of the planetary gear sets, and the power distributing mechanism 16 is switched between its step-variable and continuously-variable shifting states, by controlling the clutches C and brakes B connected to the respective rotary elements of the planetary gear sets.

While the engine 8 and the differential portion 11 are connected directly to each other in the illustrated transmission mechanism 10, they may be connected to each other indirectly through a clutch.

In the illustrated transmission mechanism 10, the differential portion 11 and the automatic transmission portion 20 are connected in series to each other. However, the control apparatus according to the present invention is equally applicable to a power transmitting system in which an electrically controlled differential portion and a step-variable transmission portion are not mechanically independent of each other, provided the power transmitting system as a whole has an electric differential function, and a shifting function different from the electric differential function. Further, the electrically controlled differential portion and the step-variable transmission portion may be suitably disposed in a desired order in the power transmitting system.

It is to be understood that the embodiment of the invention has been descried for illustrative purpose only, and that the present invention may be embodied with various changes and modifications which may occur to those skilled in the art.

What is claimed is:

1. A control apparatus for a vehicular power transmitting system including (a) an electrically controlled differential portion which has a differential mechanism and a first electric motor connected to a rotary element of the differential mechanism and which is operable to control a differential state between rotating speeds of its input and output shafts by controlling an operating state of the first electric motor, and (b) a step-variable transmission portion which constitutes a part of a power transmitting path between the electrically controlled differential portion and a drive wheel of a vehicle, said control apparatus comprising:
a coasting-shift-down control portion configured to implement a coasting shift-down action of said step-variable transmission portion during a coasting run of the vehicle, only when an actual running speed of the vehicle is lower than a predetermined reference vehicle speed, wherein the reference vehicle speed is determined such that a deceleration value is zero or a vehicle drive force is zero at the reference vehicle speed.

2. The control apparatus according to claim 1, wherein the electrically controlled differential portion is operable as a continuously-variable transmission mechanism when the operating state of the first electric motor is controlled.

3. The control apparatus according to claim 1, wherein said coasting shift-down action of the step-variable transmission portion implemented by the coasting-shift-down control portion is a shift-down action to a first gear position of the step-variable transmission portion.

4. The control apparatus according to claim 1, wherein the vehicular power transmitting system has an overall speed ratio defined by a speed ratio of the step-variable transmission portion and a speed ratio of the electrically controlled differential portion.

5. The control apparatus according claim 1, wherein the step-variable transmission portion is a step-variable automatic transmission.

6. The control apparatus according to claim 1, wherein the coasting-shift-down control portion stores in a memory the predetermined reference vehicle speed.

7. The control apparatus according to claim 1, wherein the coasting-shift-down control portion includes a reference-vehicle-speed changing portion configured to change the predetermined reference vehicle speed depending upon a gradient of a roadway on which the vehicle is running in a coasting state.

8. The control apparatus according to claim 1, wherein the coasting-shift-down control portion includes a synchronization control portion configured to implement a synchronization control of a rotating speed of an input shaft of the step-variable transmission portion in the process of the coasting shift-down action.

9. The control apparatus according to claim 8, wherein the vehicular power transmitting system further includes a second electric motor which is provided in addition to said first electric motor and which is operatively connected to the output shaft of the electrically controlled differential portion, and wherein said synchronization control portion implements said synchronization control by controlling the second electric motor.

10. The control apparatus according to claim 9, wherein the coasting-shift-down control portion is configured to place the step-variable transmission portion in a neutral state during the synchronization control implemented by the synchronization control portion.

11. The control apparatus according to claim 1, wherein the coasting-shift-down control portion includes a compensating portion configured to decelerate the vehicle in the process of the coasting shift-down action of the step-variable transmission portion, the coasting shift-down control portion initiating the coasting shift-down action at a higher running speed of the vehicle when the compensating portion is operable to decelerate the vehicle, than when the compensating portion is not operable.

12. The control apparatus according to claim 11, wherein the vehicle is provided with a wheel brake operable to brake the drive wheel, and the compensating portion is configured to decelerate the vehicle by operating the wheel brake.

13. A control apparatus for a vehicular power transmitting system including (a) an electrically controlled differential portion which has a differential mechanism and an electric motor connected to a rotary element of the differential mechanism and which is operable to control a differential state between rotating speeds of its input and output shafts by controlling an operating state of the electric motor, and (b) a step-variable transmission portion which constitutes a part of a power transmitting path between the electrically controlled differential portion and a drive wheel of a vehicle, said control apparatus comprising:
a coasting-shift-down control portion configured to implement a coasting shift-down action of said step-variable transmission portion during a coasting run of the vehicle,
wherein said coasting-shift-down control portion includes a compensating portion configured to decelerate the vehicle in the process of the coasting shift-down action of the step-variable transmission portion, the coasting shift-down control portion initiating the coasting shift-down action at a higher running speed of the vehicle when the compensating portion is operable to decelerate the vehicle, than when the compensating portion is not operable.

14. The control apparatus according to claim 13, wherein the vehicle is provided with a wheel brake operable to brake the drive wheel, and the compensating portion is configured to decelerate the vehicle by operating the wheel brake.

15. The control apparatus according to claim 13, wherein the coasting-shift-down control portion includes a synchronization control portion configured to implement a synchronization control of a rotating speed of an input shaft of the step-variable transmission portion in the process of the coasting shift-down action, and
wherein the coasting-shift-down control portion is configured to place the step-variable transmission portion in a neutral state during the synchronization control implemented by the synchronization control portion.

16. The control apparatus according to claim 13, wherein the electrically controlled differential portion is operable as a continuously-variable transmission mechanism when the operating state of the electric motor is controlled.

17. The control apparatus according to claim 13, wherein the parameter correlating to the shaft torque of the step-variable transmission portion is a running speed of the vehicle, and the coasting-shift-down control portion stores in a memory a predetermined reference value of the running speed of the vehicle at or below which said shaft torque is smaller than a predetermined upper limit, said coasting-shift-down control portion implementing the coasting shift-down action of the step-variable transmission portion when the actual running speed of the vehicle has been lowered to the predetermined reference value, and wherein the coasting-shift-down control portion includes a reference-vehicle-speed changing portion configured to change the predetermined reference value of the running speed depending upon a gradient of a roadway on which the vehicle is running in a coasting state.

18. The control apparatus according to claim 13, wherein said coasting shift-down action of the step-variable transmission portion implemented by the coasting-shift-down control portion is a shift-down action to a first gear position of the step-variable transmission portion.

19. The control apparatus according to claim 13, wherein the vehicular power transmitting system has an overall speed ratio defined by a speed ratio of the step-variable transmission portion and a speed ratio of the electrically controlled differential portion.

20. The control apparatus according to claim 13, wherein the step-variable transmission portion is a step-variable automatic transmission.

* * * * *